US007835704B2

(12) United States Patent
Joung et al.

(10) Patent No.: US 7,835,704 B2
(45) Date of Patent: Nov. 16, 2010

(54) METHOD FOR GENERATING TEST SIGNAL FOR TESTING ACCURACY OF CARRIER TO INTERFERENCE PLUS NOISE RATIO MEASUREMENT OF SUBSCRIBER STATION THROUGH BASE STATION EMULATOR

(75) Inventors: Jinsoup Joung, Seongnam-si (KR); Kyeong Min Ha, Seongnam-si (KR); Seung Hwan Ji, Seongnam-si (KR); Jun Wan Park, Seoul (KR); Jae Sung Lee, Incheon (KR)

(73) Assignee: Innowireless Co., Ltd., Seongnam-si (KR)

( * ) Notice: Subject to any disclaimer, the term of this patent is extended or adjusted under 35 U.S.C. 154(b) by 585 days.

(21) Appl. No.: 11/877,867

(22) Filed: Oct. 24, 2007

(65) Prior Publication Data
US 2008/0108316 A1    May 8, 2008

(30) Foreign Application Priority Data
Oct. 24, 2006    (KR) ...................... 10-2006-0103505

(51) Int. Cl.
*H04B 17/00*    (2006.01)
*H03C 1/62*    (2006.01)
*H04W 24/00*    (2009.01)
(52) U.S. Cl. ................. 455/67.11; 455/423; 455/67.14; 455/115.2; 455/226.1; 375/224
(58) Field of Classification Search .............. 455/67.11, 455/67.13–67.14, 115.1–115.4, 226.1–226.4, 455/423–425; 375/224–228
See application file for complete search history.

(56) References Cited

U.S. PATENT DOCUMENTS

| 6,185,419 | B1 * | 2/2001 | Sasin et al. ................. 455/423 |
| 6,915,113 | B1 * | 7/2005 | Cardiff ..................... 455/67.14 |
| 7,263,355 | B2 * | 8/2007 | Morikawa et al. ........... 455/424 |
| 7,324,588 | B2 * | 1/2008 | Green et al. ................. 375/224 |
| 7,366,652 | B2 * | 4/2008 | Wang et al. ................... 703/28 |
| 7,508,868 | B2 * | 3/2009 | Chang ........................ 375/224 |
| 7,620,368 | B2 * | 11/2009 | Wang et al. ............. 455/67.11 |
| 2002/0016937 | A1 * | 2/2002 | Houh .......................... 714/43 |
| 2002/0183054 | A1 * | 12/2002 | Rimoni et al. .............. 455/423 |
| 2005/0265430 | A1 * | 12/2005 | Ozluturk et al. ............. 375/145 |
| 2007/0099606 | A1 * | 5/2007 | Strohlein et al. ............ 455/423 |

* cited by examiner

*Primary Examiner*—Simon D Nguyen
(74) *Attorney, Agent, or Firm*—Rothwell, Figg, Ernst & Manbeck, P.C.

(57) ABSTRACT

Disclosed herein is a method for generating a test signal for testing the accuracy of the CINR measurement of a subscriber station. The method includes step (a) of checking a preamble code corresponding to a predetermined cell ID, reading corresponding preamble data from a preamble code table, and taking it as desired preamble data, step (b) of completing generation of desired signal data by generating desired pilot data and various information data, step (c) of randomly selecting one preamble code from among preamble codes corresponding to cell IDs other than the cell ID, reading corresponding preamble data from the preamble code table, and taking the preamble data as interference preamble data, step (d) of generating interference pilot data, and step (e) of generating test signal data by adding the interference preamble data and the interference pilot data to the desired signal data.

3 Claims, 5 Drawing Sheets

METHOD FOR GENERATING TEST SIGNAL FOR TESTING ACCURACY OF CARRIER TO INTERFERENCE PLUS NOISE RATIO MEASUREMENT OF SUBSCRIBER STATION THROUGH BASE STATION EMULATOR

CROSS REFERENCE TO RELATED APPLICATIONS

This application claims priority from Korean patent application No. 10-2006-0103505 filed on Oct. 24, 2006, all of which is incorporated herein by reference in its entirety for all purposes.

BACKGROUND OF THE INVENTION

1. Field of the Invention

The present invention relates generally to a method for generating a test signal for testing the accuracy of the Carrier to Interference plus Noise Ratio (CINR) measurement of a subscriber station through a base station emulator, and, more particularly, to a method for generating a test signal for testing the accuracy of the CINR measurement of a subscriber station, which is capable of efficiently and simply testing the accuracy of CINR measurement using a single base station emulator.

2. Description of the Related Art

Currently, methods of wirelessly accessing the Internet include a method for accessing the Internet via a mobile telephone network based on a Wireless Application Protocol (WAP) or Wireless Internet Platform for Interoperability (WIPI) platform, and a method for accessing the Internet via a public wireless Local Area Network (LAN) or an Access Point (AP). However, the method using a mobile telephone network has fundamental limitations on the use thereof as a universal Internet access method due to the limited screen size, the limited input interface, and the measured rate-based billing system. Meanwhile, the method using a wireless LAN has fundamental problems in that it can only be used within a range having a radius of tens of meters around an AP, and in that it also has poor mobility. In order to overcome such problems, 'portable Internet service' (mobile WiMAX, or WiBro, which is a subset of mobile WiMAX, and a Korean portable Internet standard) has been proposed as wireless Internet service capable of enabling high-speed Internet access at ADSL-level quality and cost, either when at rest or in intermediate-speed motion.

Meanwhile, a performance test of a subscriber station is a series of low-quality product filtering processes of, prior to marketing and sales, identifying subscriber stations exhibiting erroneous operation and deteriorated performance in advance and preventing the subscriber stations from being distributed on the market. In Korea, the law requires that the Korean Telecommunications Technology Association (TTA) establish a performance test procedure for information & communication equipment, and that information & communication equipment that does not pass the test be prohibited from being distributed on the market. Efforts to establish a test performance procedure for subscriber stations in the portable Internet, which is attracting attention as a new wireless communication system, have been made.

'CINR', which is one of the items of such a performance test, is an abbreviation for 'Carrier to Interference plus Noise Ratio,' and refers to a value that is obtained by dividing the power value of a signal carrier (hereinafter referred to as a 'desired signal') by the power value of the sum of an interference signal and a noise signal. That is, since the case where CINR is relatively high corresponds to the case where a desired signal is stronger than noise and interference, higher-quality signals can be received, so that the probability of receiving data without error increases. In contrast, when CINR is relatively low, the probability of receiving data mixed with errors due to noise and interference increases, thereby deteriorating service quality. A portable Internet system makes subscriber stations report CINR in consideration of the fact that the data error rate varies with CINR, and manages the subscriber stations based on the information. A 'CINR measurement accuracy test procedure' is a test for determining whether a subscriber station accurately reports CINR, and is a test procedure essentially required for the establishment of an environment in which a base station can acquire accurate CINR information and manage subscriber stations. In generally, in a 'CINR measurement accuracy test', CINR reported by a subscriber station is compared with the CINR for a signal actually provided to the subscriber station for measurement, and the subscriber station is considered to be a subscriber station having no abnormality if the difference therebetween is equal to or less than a predetermined reference value.

FIG. 1 is a system configuration diagram illustrating a method for generating a test signal for testing the accuracy of the CINR measurement of a subscriber station in a portable Internet system according to an example of the prior art, and illustrates a method for generating a test signal using two or more signal generators. According to the measuring system shown in FIG. 1, CINR is adjusted to a desired value by manually controlling the power ratio of signals respectively generated and output from two signal generators 10 and 20, with a signal, generated and output from one signal generator 10, being considered to be a desired signal desired by a portable subscriber station 100, and with a signal, generated and output from the other signal generator 20, being considered to be an interference signal. Of course, the two signals are the signals of different pieces of data.

However, in the case where a test is performed using the measuring system shown in FIG. 1, two or more signal generators 10 and 20 are required, so that both devices must be manipulated so as to adjust the CINR, a trigger line 50 for maintaining synchronization must be connected between the signal generators 10 and 20 so as to cause signal transmission time points to coincide with each other, and a combiner must be employed so as to mix the signals generated and output from the signal generators 10 and 20 and send the resulting signal to the subscriber station 100, with the result that there arise problems of inconvenience and low efficiency. Furthermore, according to the measuring system, a network entry process cannot be performed on the subscriber station 100, so that there arises a problem in that whether the network entry process of the subscriber station 100 and a report on the accuracy of later CINR measurement are accurate cannot be checked.

FIG. 2 is a system configuration diagram illustrating a method for generating a test signal for testing the accuracy of the CINR measurement of a subscriber station in a portable Internet system according to another example of the prior art, and illustrates a method for generating test signals using one base station emulator 60 and one signal generator 70. Here, the base station emulator 60 is a portable Internet measuring instrument that acts as a substitute for an actual base station by receiving signals sent by a portable subscriber station 100 to access a base station and sending corresponding signals, and that has a function of measuring the performance of the subscriber station 100. As described above, in the system shown in FIG. 2, the subscriber station 100 can go through a network entry process through the base station emulator 60, in which case the signal generator 70 performs a function of generating an interference signal, and can adjust CINR using the power ratio of a desired signal, output from the base station emulator 60, and an interference signal, output from the signal generator 70. In the case where a test is conducted using this method, there is an advantage in that whether a CINR report made after network entry is accurate can be determined, which is impossible using the first method. If the CINR measurement accuracy test procedure is configured to test CINR reports made after the network entry of the subscriber station 100, tests can be conducted using only the second system.

However, since this case requires two devices also, there are problems in that a trigger line 90 is required for synchronization between the transmission time points of a station's signal and an interference signal, and two signals must be mixed with each other using a combiner 80 and then be sent to the subscriber station 40 for connection to the subscriber station 40. Moreover, since both devices must be manipulated so as to adjust CINR, there are problems of low manipulation efficiency and inconvenience.

SUMMARY OF THE INVENTION

Accordingly, the present invention has been made keeping in mind the above problems occurring in the prior art, and an object of the present invention is to provide a method for generating a test signal for testing the accuracy of the CINR measurement of a subscriber station through a base station emulator that can generate a test signal for testing the accuracy of CINR measurement through a single base station emulator, so that a trigger line for synchronization and a combiner are not necessary, manipulation is easy, and the cost of the establishment of a test environment can be reduced.

In order to accomplish the above object, the present invention provides a method for generating a test signal for testing the accuracy of the CINR measurement of a subscriber station, in which a single portable base station emulator, having a preamble code table and a base station emulating function, is connected to the subscriber station and is executed to conduct a test of accuracy of CINR measurement of the subscriber station, the preamble conversion table storing preamble data, including cell IDs and a plurality of different Binary Phase Shift Keying (BPSK) patterns for identifying segments, in association with the cell IDs, the method including step (a) of checking a preamble code corresponding to a predetermined cell ID, reading preamble data associated with the preamble code from the preamble code table, and taking it as desired preamble data; step (b) of completing generation of desired signal data by generating desired pilot data and various information data; step (c) of randomly selecting one preamble code from among preamble codes corresponding to cell IDs other than the cell ID described at step (a), reading preamble data associated with this preamble code from the preamble code table, and taking the preamble data as interference preamble data; step (d) of generating interference pilot data; and step (e) of generating test signal data by adding the interference preamble data and the interference pilot data, respectively generated at steps (c) and (d), to the desired signal data generated at step (b).

In the above configuration, the interference preamble data generated at step (c) may be considered to be the interference pilot data described at step (d). Alternatively, the interference pilot data described at step (d) may be generated by randomly increasing or decreasing the desired pilot signal, generated at step (b), by a predetermined amount.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
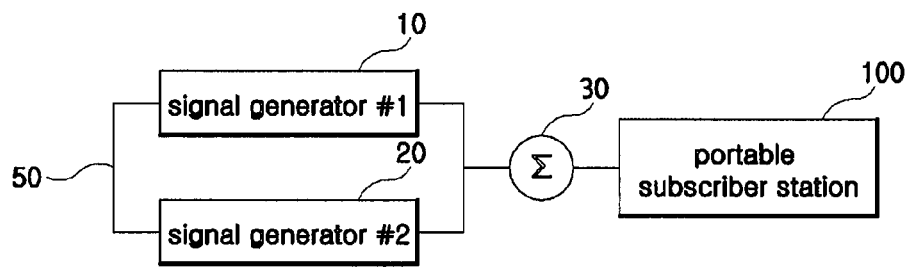
FIG. 1 is a system configuration diagram illustrating a method for a generating test signal for testing the accuracy of the CINR measurement of a subscriber station in a portable Internet system according to an example of the prior art.
Figure 2:
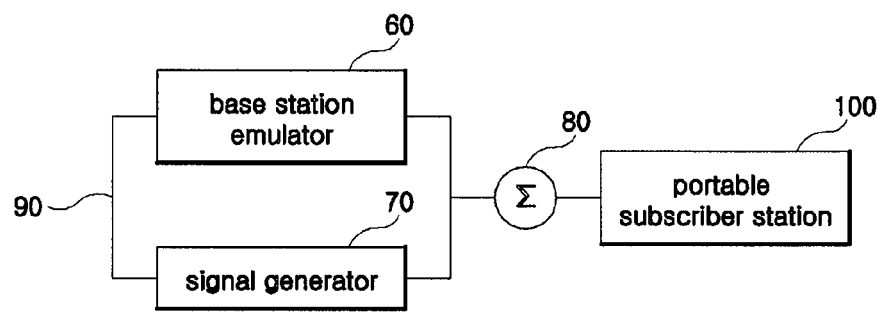
FIG. 2 is a system configuration diagram illustrating a method for generating a test signal for testing the accuracy of the CINR measurement of a subscriber station in a portable Internet system according to another example of the prior art.

Reference now should be made to the drawings, in which the same reference numerals are used throughout the different drawings to designate the same or similar components.

A preferred embodiment of a method for generating a test signal for testing the accuracy of the CINR measurement of a subscriber station through a base station emulator according to the present invention will be described in detail. Prior to the description, a portable Internet system will be described in brief first.

Figure 3:
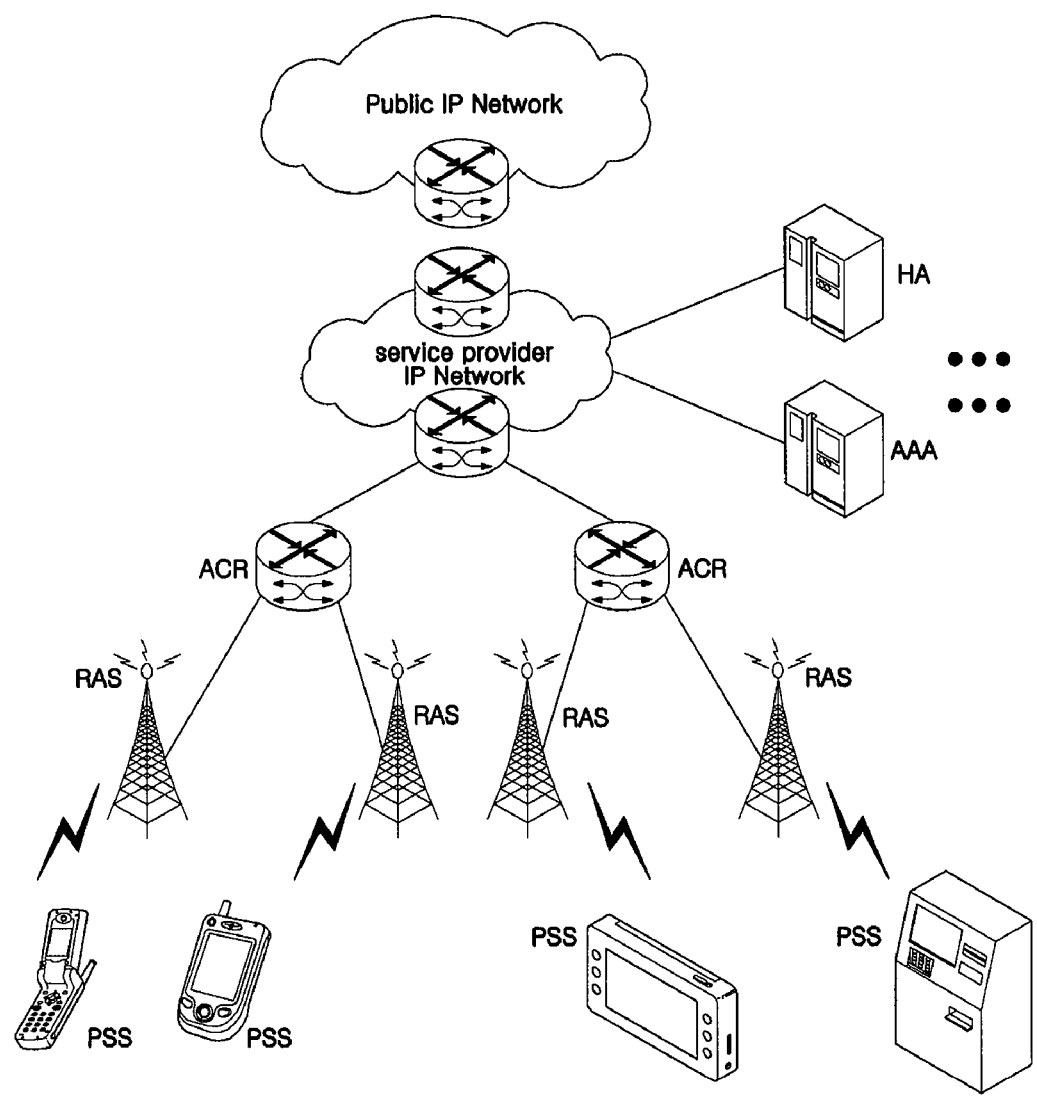
FIG. 3 is a network configuration diagram of a typical portable Internet system.

FIG. 3 is a network configuration diagram of a typical portable Internet system. As shown in FIG. 3, the basic configuration of the portable Internet system includes a Portable Subscriber Station (PSS), which is previously referred to as "subscriber station," a Radio Access Station (RAS), and an Access Control Router (ACR). In the above-described configuration, the PSS performs functions of portable Internet wireless access, IP-based service access, IP mobility, subscriber station/user authentication and security, multicast service reception, and interworking with other networks. Meanwhile, the RAS performs functions of portable Internet wireless access, radio resource management and control, mobility handoff support, authentication and security, QoS provision, downlink multicast, billing, and statistical information creation and notification. Finally, the ACR performs functions of IP routing and mobility management, authentication and security, QoS provision, IP multicast, the provision of billing service to a billing server, mobility control between RASs within an ACR, and resource management and control.

Figure 4:
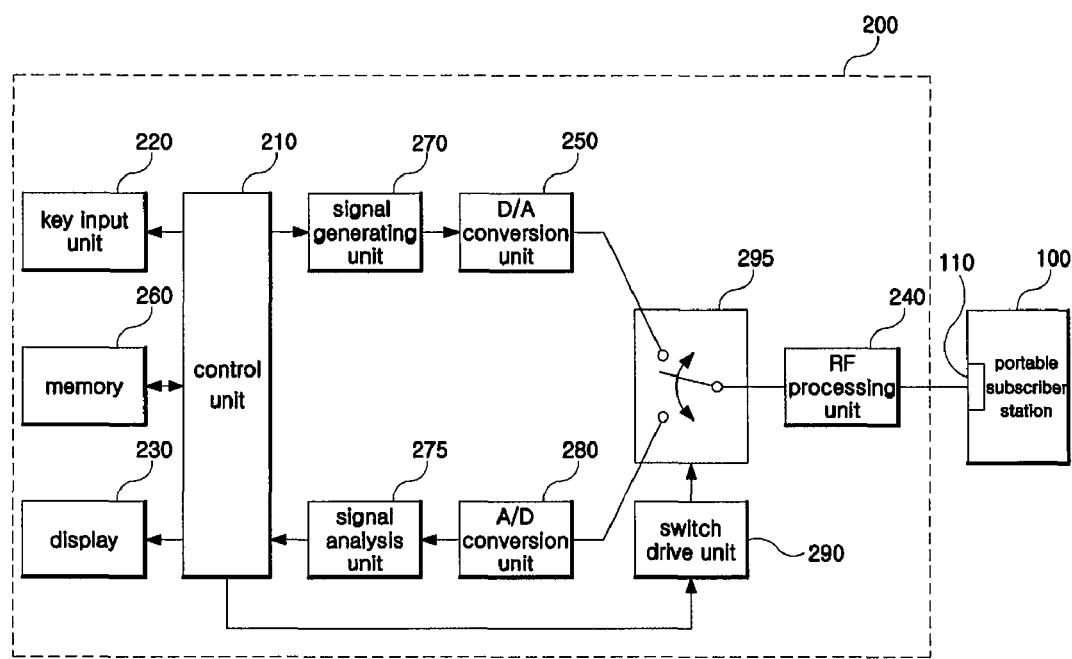
FIG. 4 is a block diagram showing a base station emulator to which a method of generating a test signal according to the present invention may be applied.

FIG. 4 is a system configuration diagram illustrating a method for generating a test signal for testing the accuracy of the CINR measurement of a subscriber station through a base station emulator according to the present invention. As shown in FIG. 4, the method of the present invention generates a test signal, in which a desired signal and an interference signal are combined, using only one base station emulator 200. The base station emulator 200 of the present invention, having a function of testing the accuracy of the CINR measurement of the subscriber station 100 as described above, emulates partial functions of a base station, thus performing a function of sending various Media Access Control (MAC) messages, such as a CINR report request message and a CINR measurement accuracy test signal to the subscriber station 100, like an actual base station, a function of modulating and encoding various messages necessary for communication with the subscriber station 100 at predetermined time points and in response to the occurrence of a required or related event in real time, and, additionally, a function of receiving an UL subframe, containing a CINR measurement report, from the subscriber station 100 and making necessary analyses. Meanwhile, the base station emulator 200 may be connected to the Radio Frequency (RF) input/output terminal 110 of the subscriber station 100 over a wire cable.

In greater detail, the base station emulator 200 according to the present invention, as shown in FIG. 4, includes a control unit 210 for controlling the overall operation of the device, a key input unit 220 for receiving various set or input items required for the measurement of the performance of the subscriber station, that is, the test of the accuracy of CINR measurement, such as a preamble code, corresponding to a cell ID to be used as desired preamble data, as described below, and a desired CINR value, from a user, a display 230 for visually notifying a user of various events occurring during the operation of the device or performance analysis results, a signal generation unit 270 for, under the control of the control unit 210, performing a network entry process in connection with the subscriber station 100 and generating a test signal for testing the accuracy of CINR measurement, memory 260 for storing the set or input items from a user and temporarily storing various pieces of data generated in the process of generating a test signal, a D/A conversion unit 250 for converting various types of digital data, generated by the signal generation unit 270, into corresponding analog signals, an RF processing unit 240 for RF-modulating and outputting the analog signal obtained through the D/A conversion unit 250, and RF-demodulating a signal RF-modulated by and received from the subscriber station 100, an A/D conversion unit 280 for converting the analog signal, obtained through the RF processing unit 240, into corresponding digital data, a signal analysis unit 275 for decoding and analyzing the digital data obtained through the A/D conversion unit 280, a switch 295 for selectively connecting the RF processing unit 240 to the D/A conversion unit 250 or to the A/D conversion unit 280, and a switch drive unit 290 for operating the switch 295 under the control of the control unit 210.

In the above-described configuration, the signal generation unit 270 and the signal analysis unit 275 may be implemented using Field Programmable Gate Arrays (FPGA) or Digital Signal Processor (DSP) boards. The control unit 210 may be implemented using a typical microcomputer. The display 230 may be implemented using a flat panel display such as a CRT or an LCD. The switch 295 may be implemented using a non-contact semiconductor switch.

Meanwhile, in the present base station emulator 200, a single control unit 210 controls both the signal generation unit 270 and the signal analysis unit 275, so that a separate trigger line is not necessary.

Figure 5:
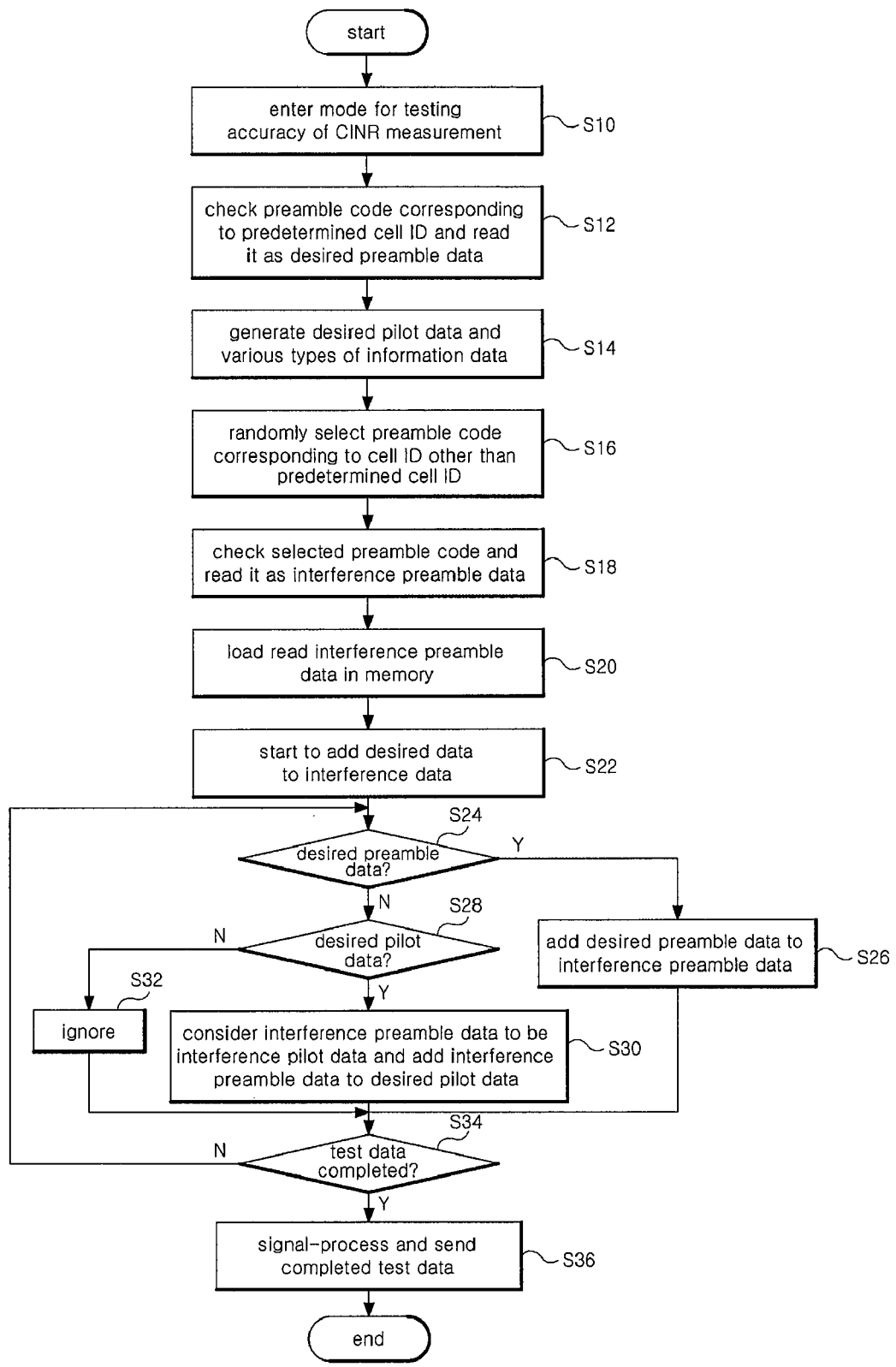
FIG. 5 is a flowchart showing the method for generating a test signal for testing the accuracy of the CINR measurement of a subscriber station through a base station emulator according to the present invention.
Figure 6:
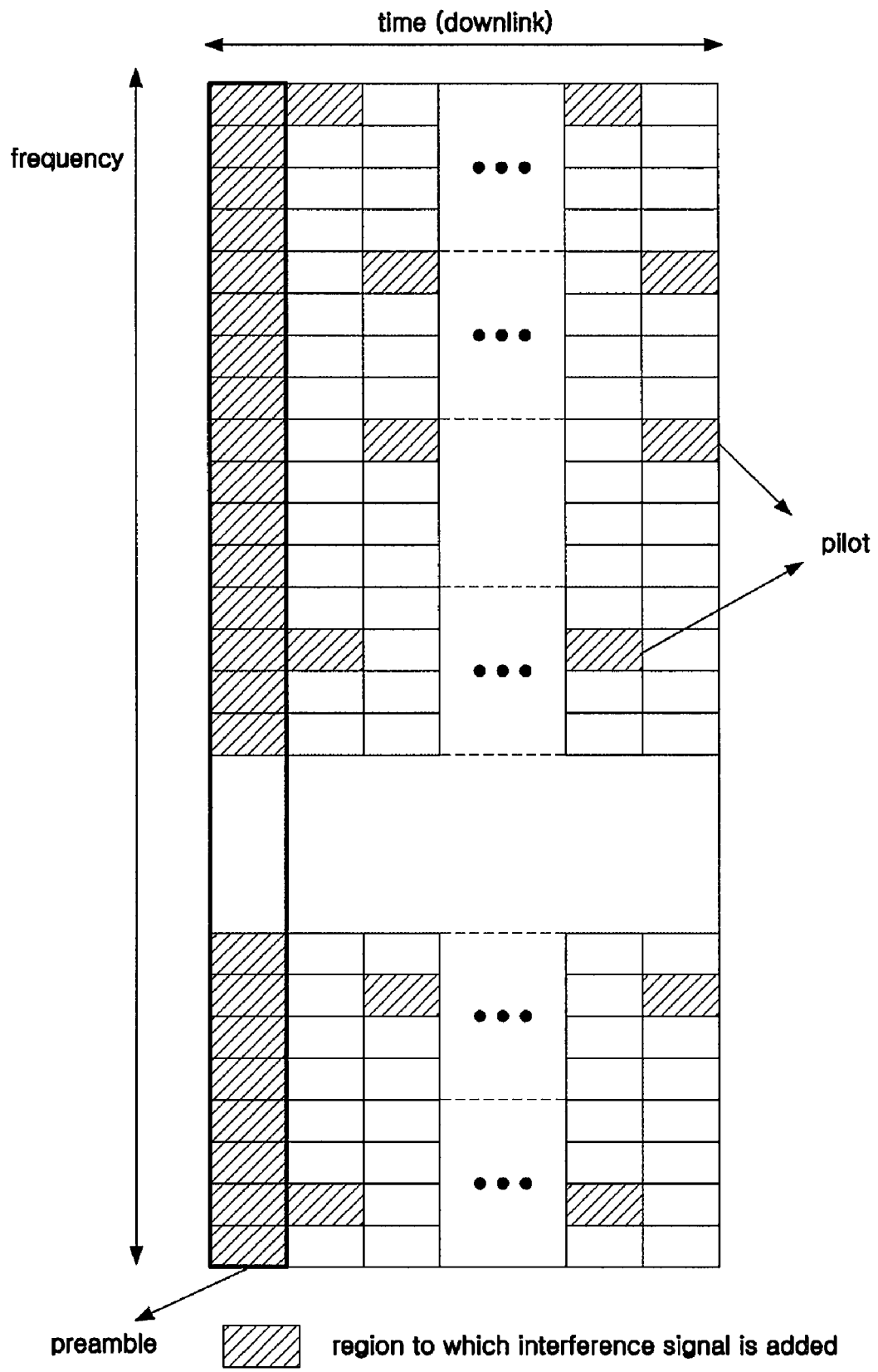
FIG. 6 is a diagram illustrating portions in which an interference signal is added to a desired signal in the method of the present invention.

FIG. 5 is a flowchart showing the method for generating a test signal for testing the accuracy of the CINR measurement of a subscriber station through a base station emulator according to the present invention. The control unit 210 performs operation unless otherwise specified. FIG. 6 is a diagram illustrating portions in which an interference signal is added to a desired signal in the method of the present invention. First, as shown in FIG. 5, at step S10, the base station emulator 200 enters a CINR measurement accuracy test mode while connecting to a test-target subscriber station 100 via the RF input/output terminal 110. This step S10 may be performed at a user's command.

Next, at step S12, a preamble code corresponding to a predetermined cell ID is checked, and desired preamble data associated with the preamble code is read from a previously prepared preamble code table. In the portable Internet system, downlink signals directed from the base station to the subscriber station may be classified into preamble signals disposed in first symbol sections and configured to perform frame timing acquisition, frequency offset estimation, cell search, symbol timing estimation and channel measurement and estimation, pilot signals configured to perform various tests or measurements, and data signals configured to contain various types of information or content. Preamble signals have base station unique numbers (cell IDs) and a total of 114 different Binary Phase Shift Keying patterns for the identification of segments, while pilot signals always have a fixed value and are arranged in slots predetermined according to the specifications.

Thereafter, at step S14, desired pilot data and various information data are generated, thereby completing the generation of a desired signal. At step S16, one preamble code is arbitrarily selected from among preamble codes 113 corresponding to 113 cell IDs, other than the cell ID, that is, a cell ID corresponding to a preamble code used as desired preamble data. Thereafter, at step S18, preamble data associated with the preamble code selected as described above is read from the preamble code table and is taken as interference preamble data, and interference pilot data is generated and is then added to the generated desired signal.

In greater detail, in order to actually generate an interference signal, an interference preamble signal, an interference pilot signal and an interference data signal must all be generated, but, in practice, the subscriber station 100 can measure CINR using only a preamble signal and a pilot signal. Accordingly, a process of inserting interference into the data signal may be omitted. As a result, the processing time taken to add such interference to the data signal is eliminated. That is, from the point of view of the characteristics of the base station emulator 100, which must exchange signals with the subscriber station 100 in real time, the reduction in the processing time is significantly important, so that interference is not inserted into a data signal. FIG. 6 illustrates that, in a downlink frame, the desired signals are added to interference signals only in preamble regions and pilot regions (refer to hatched portions).

Meanwhile, although interference pilot data may be generated by randomly increasing or decreasing a fixed desired pilot value by the size of interference, interference preamble data is considered to be interference pilot data, and is then added to the desired pilot data without separately generating an interference pilot signal, because data generated using the interference preamble signal may also be considered to be generated randomly. This is mathematically expressed as follows. Assuming that an interference preamble signal and an interference pilot signal are $I_{pb}$ and $I_p$, respectively, and a desired preamble signal and a desired pilot signal are $S_{pb}$ and $S_p$, respectively, an input CINR value R is defined as follows:

$$R = |S_{pb}|/|I_{pb}| = |S_p|/|I_p| \tag{1}$$

Meanwhile, since the interference pilot signal is generated using the interference preamble signal as described above, the interference pilot signal is expressed by the following Equation 2:

$$I_p = \alpha I_{pb} \tag{2}$$

In the above Equation 2, $\alpha$ represents the ratio of the magnitude of the pilot signal to that of the preamble signal. Meanwhile, assuming that a desired signal and an interference signal, in which preamble signals and pilot signals are added to each other, are $T_{pb}$ and $T_p$, respectively, these can be defined as the following Equations 3 and 4, in which case the magnitude of the interference preamble signal and the magnitude of the interference pilot signal can be expressed by the following Equations 5 and 6, respectively, using the magnitude of a station's preamble signal $|S_{pb}|$ and R value.

$$T_{pb}=S_{pb}+I_{pb} \qquad (3)$$

$$T_p=S_p+I_p \qquad (4)$$

$$|I_{pb}|=|S_{pb}|/R \qquad (5)$$

$$|I_{pb}|=|S_{pb}|/R*\alpha \qquad (6)$$

Referring to FIG. 5 again, for this purpose, at step S20, the interference preamble data is loaded into memory to generate the interference pilot signal from the interference preamble data, and, at step S22, the desired signal data and the interference signal data start to be added to each other. That is, at step S24, whether the desired signal to be added is the desired preamble data is checked. If the desired data is the desired preamble data, the desired preamble data is added to the interference preamble data loaded into the memory, and then the process proceeds to step S34. At step S34, whether the preparation of test signal data, obtained by adding the desired signal with the interference signal, has been completed, that is, whether a downlink frame has been completed, is checked. If, as a result of the determination at step S34, the test signal data has not been completed, the process returns to step S24. Meanwhile, if, as a result of the determination at step S24, the desired signal currently being processed is not the desired preamble data, the process returns to step S28, and then whether the desired signal is the desired pilot data is determined. If, as a result of the determination at step S28, the desired signal is determined not to be the desired pilot data, the desired signal is assumed to correspond to a data signal. Accordingly, the desired signal is ignored at step S32, and the process proceeds to step S34. In contrast, if the desired signal is determined to be the desired pilot data, the process proceeds to step S30 and then the interference preamble data, loaded in the memory, is considered to be the interference pilot data and is added to the desired pilot data. If the preparation of the test signal data is completed at step S34, the process proceeds to step S36, and then the completed test data is DA-converted and RF-processed and sent to the subscriber station 100. Thereafter, a CINR value, reported by the subscriber station 100, is checked for the accuracy of measurement.

The method for generating a test signal for testing the accuracy of the CINR measurement of a subscriber station through a base station emulator according to the present invention is not limited to the above-described embodiment, but may be variously modified within the range of the technical spirit of the present invention. For example, although not described in the above-described embodiment, the base station emulator 200 may completes a network entry process, necessary in connection with the subscriber station 100, before a test of the accuracy of CINR measurement. In regard to such a network entry process, a process that is applicable to the cases where systems, including base stations, register new subscriber stations or new nodes with communication networks must be supported. That is, the network entry process is performed to handle the maintenance of the quality of communication with a base station, the calibration of the start point of a UL section, the allocation of a CID by a base station for communication, and the negotiation of a support profile after a subscriber station has been turned on.

Meanwhile, if necessary, a test signal may be generated by adding only the desired preamble data and the interference preamble data to each other, or by adding only the desired pilot data and the interference pilot data to each other.

In accordance with the above-described method for generating a test signal for testing the accuracy of the CINR measurement of a subscriber station through a base station emulator according to the present invention, a test signal generation method can be implemented using a single base station emulator without requiring signal generators, so that there is an advantage of cost reduction. Furthermore, the processing time taken to generate and add an interference signal in the base station emulator can be reduced, and it is not necessary to generate interference for a data signal because a subscriber station measures and reports a CINR value using only a preamble signal and a pilot signal, thereby bringing about an advantage of reducing the speed of a process of generating and adding an interference signal. Furthermore, a complicated processing procedure must be performed to generate a signal in the portable Internet system, while the method of the present invention reads and uses values loaded in memory without requiring complicated calculations, thereby reducing the processing time and generating an interference signal in a simple way.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for generating a test signal for testing accuracy of Carrier to Interference plus Noise Ratio (CINR) measurement of a subscriber station, in which a single portable base station emulator, having a preamble code table and a base station emulating function, is connected to the subscriber station and is executed to conduct a test of accuracy of CINR measurement of the subscriber station, the preamble conversion table storing preamble data, including cell IDs and a plurality of different Binary Phase Shift Keying (BPSK) patterns for identifying segments, in association with the cell IDs, the method comprising:

step (a) of checking a preamble code corresponding to a predetermined cell ID, reading preamble data associated with the preamble code from the preamble code table, and taking it as desired preamble data;

step (b) of completing generation of desired signal data by generating desired pilot data and various information data;

step (c) of randomly selecting one preamble code from among preamble codes corresponding to cell IDs other than the cell ID described at step (a), reading preamble data associated with this preamble code from the preamble code table, and taking the preamble data as interference preamble data;

step (d) of generating interference pilot data; and step (e) of generating test signal data by adding the interference preamble data and the interference pilot data, respectively generated at steps (c) and (d), to the desired signal data generated at step (b).

2. The method as set forth in claim 1, wherein the interference preamble data generated at step (c) is considered to be the interference pilot data described at step (d).

3. The method as set forth in claim 1, wherein the interference pilot data described at step (d) is generated by randomly increasing or decreasing the desired pilot signal, generated at step (b), by a predetermined amount.

* * * * *